United States Patent [19]
Frantz

[11] Patent Number: 5,870,931
[45] Date of Patent: Feb. 16, 1999

[54] PROTECTIVE COVER ASSEMBLY FOR COMMERCIAL VEHICLE DRIVE TRAINS

[75] Inventor: Lamond N. Frantz, Palmerton, Pa.

[73] Assignee: Louis Sportelli, Palmerton, Pa.

[21] Appl. No.: 888,440

[22] Filed: Jul. 7, 1997

Related U.S. Application Data

[63] Continuation-in-part of Ser. No. 444,003, May 18, 1995, abandoned.

[51] Int. Cl.$^6$ .............................. F16H 57/02; F16P 1/00
[52] U.S. Cl. ............................ 74/609; 74/608; 464/170
[58] Field of Search ................... 74/608, 609; 464/170, 464/154, 172

[56] References Cited

U.S. PATENT DOCUMENTS

| | | | |
|---|---|---|---|
| Re. 30,152 | 11/1979 | Davis | 74/609 X |
| 2,381,399 | 8/1945 | Brown | 180/85 |
| 2,775,905 | 1/1957 | Jackson | 74/609 |
| 2,906,360 | 9/1959 | Daley, Jr. | 180/70 |
| 3,797,329 | 3/1974 | Quirk | 74/609 |
| 4,308,931 | 1/1982 | Khanna | 180/235 |
| 4,501,572 | 2/1985 | Hook | 464/170 |
| 4,553,950 | 11/1985 | Teich | 74/609 X |
| 4,568,313 | 2/1986 | Diffenderfer et al. | 464/172 |
| 4,663,984 | 5/1987 | Taylor | 74/608 |
| 4,696,660 | 9/1987 | Murphy et al. | 74/609 X |
| 4,702,724 | 10/1987 | Vater | 74/609 |
| 4,747,804 | 5/1988 | Benzi | 464/170 |
| 4,761,152 | 8/1988 | Wagenbach | 464/176 |

FOREIGN PATENT DOCUMENTS

| | | | |
|---|---|---|---|
| 1208959 | 2/1960 | France | 74/609 |
| 1201573 | 8/1970 | United Kingdom | 74/609 |
| 2212586 | 7/1989 | United Kingdom | 74/609 |

*Primary Examiner*—Vinh T. Luong
*Attorney, Agent, or Firm*—Sanford J. Piltch

[57] ABSTRACT

A protective cover assembly for universal joints which is particularly suited for commercial vehicles such as trucks and buses, as well as off-road vehicles, comprises forward, intermediate and rearward shields that overlie but do not touch respective universal joints. In one embodiment, the shields have outside brackets that attach to either the cover of a transmission or the cover of a differential gear mechanism and are adjustable inward and outward relative to the covers. In another embodiment, the shields have brackets that respectively have straps for connecting to the body underside frame rails of the vehicle and are adjustable forward and rearward to cover the universal joints the shields overlie.

14 Claims, 2 Drawing Sheets

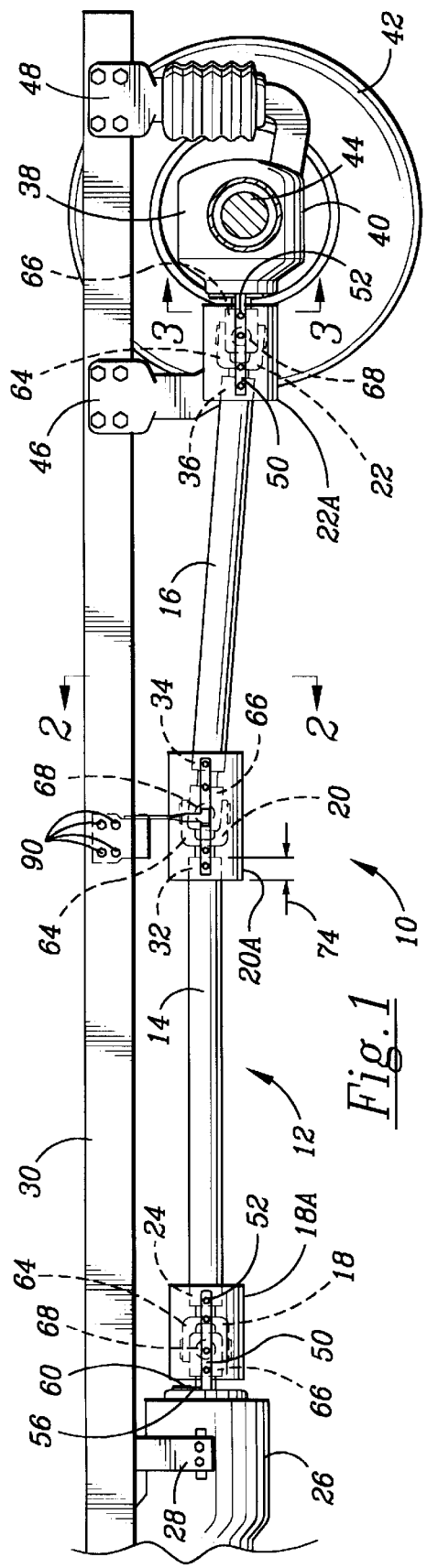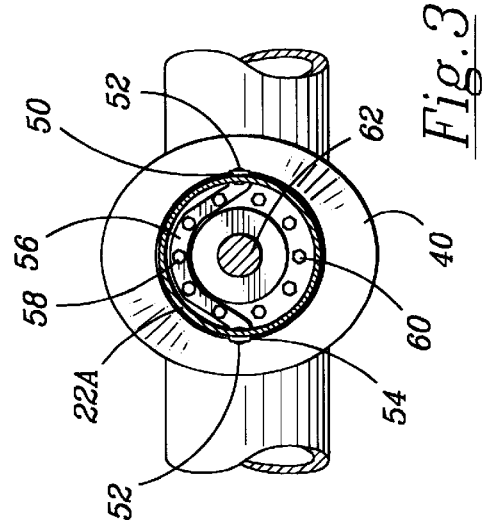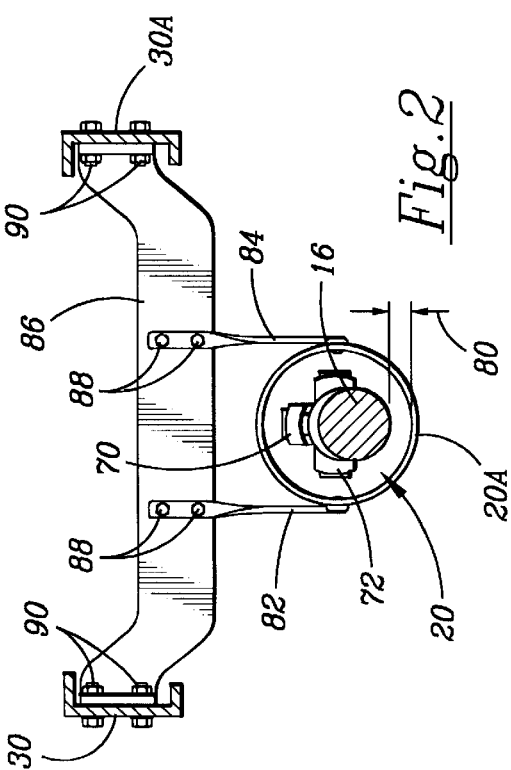

PROTECTIVE COVER ASSEMBLY FOR COMMERCIAL VEHICLE DRIVE TRAINS

CROSS-REFERENCE TO RELATED APPLICATION

This application is a continuation-in-part of U.S. patent application Ser. No. 08/444,003, filed May 18, 1995, now abandoned.

FIELD OF THE INVENTION

The present invention relates to a protective cover assembly and, more particularly, to a protective cover assembly for shielding the drive train of a commercial vehicle having multiple interconnected segments and for catching and retaining lubricant thrown off by the multiple interconnected segments of the drive train.

BACKGROUND OF THE INVENTION

Protective covers for shielding universal joints and drive trains of a vehicle have been previously known and disclosed in several U.S. patents. U.S. Pat. No. 2,906,360 [Daley, Jr.] shows a torque tube 10 which may be considered to be a noise shielding or deadening device. U.S. Pat. No. 3,797,329 [Quirk] discloses a safety shield for use over the drive shaft to interconnect the power take-off assembly of a tractor to a rotary drive of an agricultural implement. U.S. Pat. Nos. 4,308,931 [Khanna] and 4,568,313 [Diffenderfer, et al.] also show protective coverings for an articulated drive shaft between a tractor and a powered agricultural implement. Finally, U.S. Pat. No. 4,501,572 [Hook] discloses a protective covering assembly for a grease fitting of a universal joint attached to the output shaft of an agricultural or other industrial vehicle, primarily front wheel drive tractors. None of these disclosed devices is particularly well suited for commercial vehicles, such as motor trucks, other "over-the-road" vehicles, such as buses, or "off-road" vehicles.

Motor trucks and buses have extended wheelbases in excess of 16 feet and have drive trains with drive shafts formed of multiple sections that are interconnected by universal joints. Universal joints are flexible joints which couple two drive shaft segments to permit either segment to be positioned out of straight-line alignment with respect to the other and are usually exposed to the environment. Universal joints may be packed with lubricant and sealed for life. Conversely, replacement joints and other universal joints may require lubrication and have grease fittings to accommodate such lubrication.

Universal joints having life time sealing may house high performance bearings and the slightest bit of dirt or other adhering contaminant may deleteriously grind and damage the bearing. Because of their physical location on motor trucks and buses, universal joints are particularly susceptible to being damaged by road grit and water or salt spray created by the motor truck and/or bus moving over wet and dirty road surfaces.

Universal joints not having life time sealing are also susceptible to road grit and water spray and are recommended to always remain fully greased. Further, it is common for universal joints to be lubricated with excessive grease, more particularly, to have grease applied until it oozes out of the universal joint.

Universal joints have separate shielding concerns when located on a vehicle, especially on a motor truck, bus, or off-road truck, that is subject to a high degree of road grit and mud. More particularly, both sealed and unsealed universal joints should be shielded from having dirt, grit and other contaminants finding their way into their high performance bearings so as to preserve mechanical integrity of both the sealed and unsealed universal joints. Conversely, unsealed universal joints should be shielded so that their excessive grease does not find its way onto the body of the vehicle so as to deleteriously affect the physical integrity of the vehicle, that is, have the grease attach to the body of a vehicle so that it allows the accumulation of road salt, or other contaminants that might harm the physical integrity of the vehicle. It is desired that a protective cover assembly be provided to shield and shelter both sealed and unsealed universal joints used on a motor truck, a bus, or an off-road vehicle.

Accordingly, it is a primary object of the present invention to provide a protective cover assembly that shields both sealed and unsealed universal joints that are used on trucks, buses, and off-road vehicles.

It is another object of the present invention to provide a protective cover assembly for universal joints that interconnect sections of the drive shaft of a vehicle to prevent contamination by materials from the roadway and to catch and retain excessive lubricant from the joints.

It is a still further object of the present invention to provide for a protective cover assembly that not only preserves the mechanical integrity of the universal joint, but also helps preserve the physical integrity of the vehicle carrying the universal joints.

Further objects and features of the present invention will become evident hereinafter.

SUMMARY OF THE INVENTION

The present invention is directed to a protective cover assembly used on a vehicle that not only preserves the mechanical integrity of a universal joint, but also helps preserve the physical integrity of the vehicle itself.

The protective cover assembly is particularly suited for the drive train of a vehicle running along the body underside frame rails. The drive train has first and second sections and includes forward, intermediate and rearward universal joint means each having a known outermost dimension. The first section has a first end connected to the drive means or transmission of the vehicle by the forward universal joint means and its second end connected to a first end of a intermediate universal joint means which, in turn, has its second end connected to the first end of the second section. The second section has its second end connected to a differential drive means of the vehicle by the rearward universal joint means. The protective cover assembly comprises forward, intermediate and rearward shields. The forward and rearward shields are dimensioned so as to at least respectively encompass but not touch the forward and rearward universal joint means. The forward and rearward shields have attaching means for respectively fixedly mounting to the drive means and to the differential drive means. The intermediate shield is dimensioned so as to at least encompass but not touch the intermediate universal joint means and has attaching means for fixedly mounting to at least one of the body underside frame rails.

The drive train may also be configured in at least two sections and have at least three universal joints requiring at least three protective cover assemblies. In some instances, in which a commercial vehicle has dual rear drive axles, additional shields comprising a protective cover assembly are to be used to shield the interconnection between the drive axles.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 1 is a side elevational view of the protective cover assembly of the present invention shown in the mounted position along the drive train of a commercial vehicle.

FIG. 2 is a sectional view, taken along Line 2—2 of FIG. 1, of the first embodiment of the protective assembly of the present invention positioned over an interconnecting universal joint and mounted to a body underside frame rail of a commercial vehicle.

FIG. 3 is a sectional view, taken along Line 3—3 of FIG. 1, of a second embodiment of the protective assembly of the present invention positioned over an interconnecting universal joint and second sections mounted to the differently drive means of a commercial vehicle.

BRIEF DESCRIPTION OF THE PREFERRED EMBODIMENTS

Figure 4:
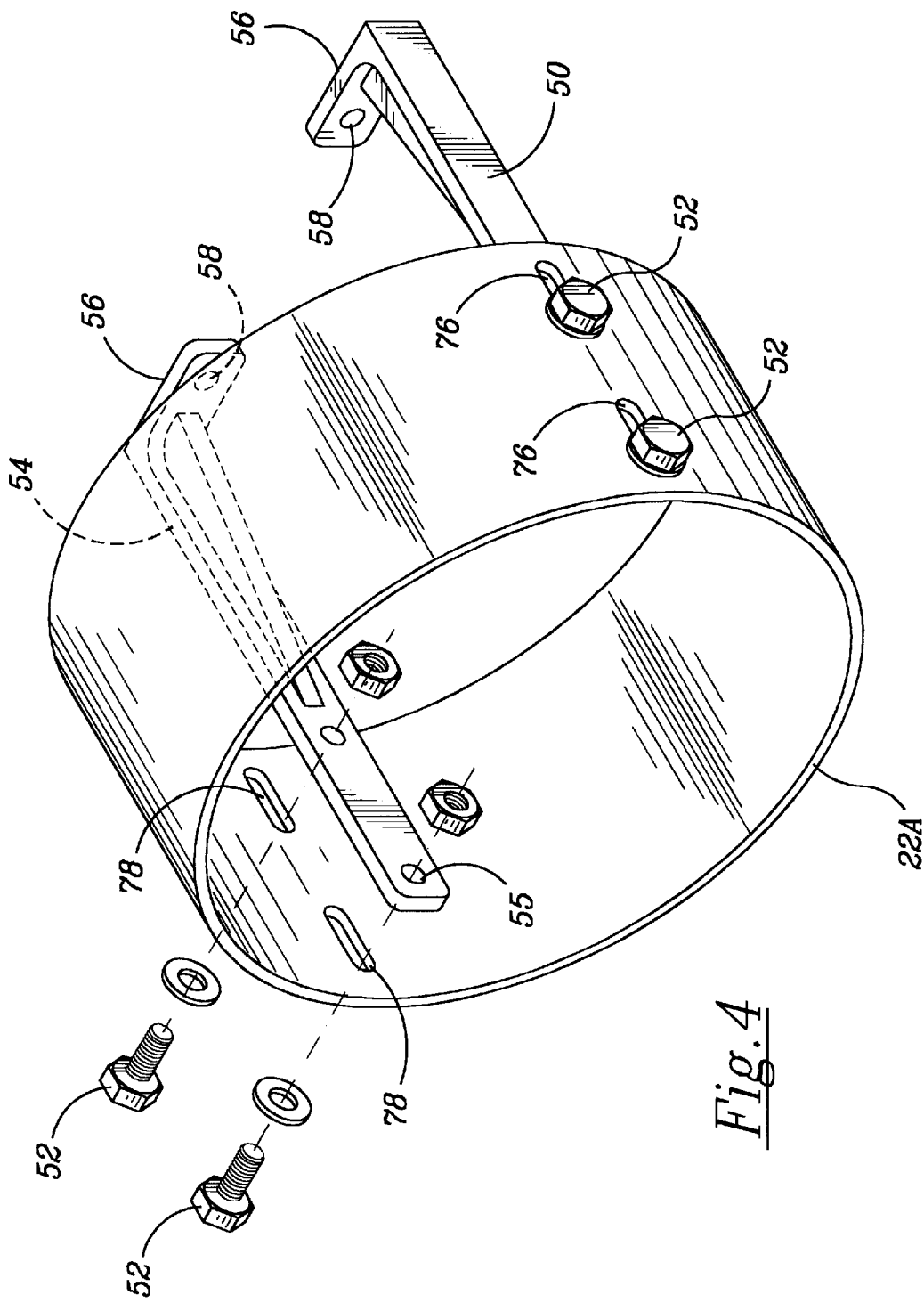
FIG. 4 is an enlarged perspective view of the first embodiment of the shield of the present invention.

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Referring now to the drawings in detail, where like numerals refer to like parts or elements, there is shown in FIG. 1 a side elevational view of the protective cover assembly 10 of the present invention shown in position along the drive train 12 of a commercial vehicle, such as a truck, bus, or off-road vehicle. The drive train 12 comprises first and second drive shaft sections 14, 16, respectively, mounted on the commercial vehicle from front to rear. The drive train also includes forward, intermediate and rearward universal joint means 18, 20 and 22, respectively, mounted on the commercial vehicle from front to rear. The protective cover assembly 10 shields the first, second and third universal joint means 18, 20 and 22 and is comprised of forward, intermediate and rearward shields 18A, 20A and 22A, respectively, arranged and mounted about the universal joint means as shown in FIG. 1. The first section 14 of drive train 12 has a first end 24 which is connected to a drive means 26 of the vehicle by means of the forward universal joint means 18.

The drive means 26 is the transmission of the vehicle and converts the torque produced by the engine into power for moving the vehicle. The drive means 26 has a supporting brace 28 which is connected to a frame rail 30 along the underside of the vehicle. The vehicle, partially illustrated in FIG. 1, may be a motor truck or another so called "over-the-road" vehicle, such as a bus, having a relatively long wheelbase, in excess of 16 feet, mandating the need for the first and second sections 14, 16 of the drive shaft 12. For such applications, if a continuous drive shaft 12 was used it might encounter, because of the magnitude of the torque being transmitted from the drive means 26, a twisting action which could render the drive shaft 12 inoperative over a period of time. Although, the protective cover assembly 10 of the present invention is particularly suited for the segmented drive shaft 12 illustrated in FIG. 1, it should be recognized that the principles of this invention are equally applicable to a continuous drive shaft such as those found on off-road vehicles that are commonly subjected to muddy and dirty conditions as found on off-road trails.

The first section 14 of the drive shaft 12 has second end 32 connected to the first end of the intermediate universal joint 20 which, in turn, has its second end connected to a first end 34 of the second section 16 which, in turn, has its second end 36 connected to differential drive means 38 by the rearward universal joint 22.

Differential drive means 38 is lodged within the rear axle housing 40 and serves as the gear assembly that allows for the movement of the rear wheels, such as 42, at different speeds by way of appropriate gearing and a split rear axle shaft 44. Support members 46, 48, arranged as shown in FIG. 1, provide suspension functions for the rear wheel 42.

The rearward shield 22A is mounted to the cover of differential drive means 38, in part, by a first bracket arm 50 extending outward from the cover of the differential drive means 38 to the outer surface of the rearward shield 22A by non-permanent attachment means such as the nut and bolt system 52 and which may be further described with reference to FIGS. 4 and 3, which is a view taken along Line 3—3 of FIG. 1.

As shown in FIG. 3, the rearward shield 22A preferably further comprises a second bracket arm 54 also extending outward from the cover of the differential drive means 38 to the outer surface of the rearward shield 22A by nut and bolt system 52. A lower bracket extension or foot 56 is located at one end of each of the bracket arms 50, 54 and has a plurality of apertures 58, preferably at least two equally spaced apart apertures 58. The apertures 58 in the bracket foot 56 accommodate the insertion and attachment of fastening means 60 of the cover of the differential drive 38 having a pinion shaft 62 so that the cover 22A is held fixedly in position in the front of the differential drive means 38 and surrounding the rearward universal joint means 22.

The forward shield 18A, shown in FIG. 1, is connected to the drive means 26 in the same manner as described for the connection of the rearward shield 22A to the differential drive means 38. The forward shield 18A also has outwardly extending first bracket arm 50 and second bracket arm 54 (not shown) and bracket foot 56 to which the bracket arms 50, 54 are attached. The bracket arms 50, 54 are attached to the forward shield 18A by semi-permanent fastening means such as nut and bolt system 52. The bracket foot 56 has a number of apertures 58 which are spaced to accommodate the mounting of the forward shield 18A to the rear of the housing of the drive means 26 by means of the existing cover bolts or fastening means 60 already present on the drive means 38. It is to be noted that a single element constructed of the first and second bracket arms 50, 54 and the bracket foot 56 which is appropriately shaped and adjustably (as described hereinafter) mounted to the forward or rearward shield 18A, 22A falls within the scope of the invention.

The mounting of the intermediate shield 20A, and also additional details of each of the universal joint means 18, 20 and 22 may be further described with reference to FIGS. 1 and 2. Each of the universal joint means 18, 20 and 22 comprises a yoke 64, a flange 66, and a cross member 68 having first and second arms 70, 72, respectively. The yoke 64, flange 66, and cross member 68, establish an outermost dimension that is taken into account for the selection of the inner diameter of each of the forward, intermediate and rearward shields 18A, 20A and 22A. More particularly, the forward, intermediate and rearward shields 18A, 20A and 22A are selected to have an innermost dimension, such as an inner diameter, to respectively encompass but not touch the forward, intermediate and rearward universal joints 18, 20 and 22. In so doing, the forward, intermediate and rearward shields 18A, 20A and 22A respectively shelter universal joints 18, 20 and 22 while allowing freedom of rotational movement.

Further, the forward, intermediate and rearward shields 18A, 20A and 22A are dimensioned to extend beyond the interconnection between the segments of the drive shaft 12. In particular, the first and second ends of each of the first and second sections 14, 16 extend by a pre-determined distance, such as distance 74 shown with reference to the intermediate shield 20A, beyond the interconnection point by an amount in the range from about one inch to about two inches. Each of the forward, intermediate and rearward shields 18A, 20A and 22A preferably has a cylindrical shape and may be formed from a non-ferrous metal, e.g. aluminum, or have an anodized coating over a ferrous metal, which coating protects against deterioration of the shield from oxidation with materials encountered along the roadways. The shields 18A, 20A and 22A may also be formed from a hardened, high density, rigid polymer material. The dimensioning of the shields 18A, 20A also takes into account the vertical offset relative to the second end 32 of section 14 and the first end 34 of section 16 (as shown in FIG. 1) and may be further described with reference to FIG. 2 showing further details of the intermediate shield 20A in a view taken along Line 2—2 of FIG. 1 and to FIG. 4.

As shown in FIG. 2, the intermediate shield 20A is not only dimensioned to encompass, but not touch, the intermediate universal joint means 20, it is also dimensioned to encompass, but not touch, the first end 34 of the second section 16. As shown in FIG. 2, the innermost dimension of the cylindrical intermediate shield 20A is separated from both the intermediate universal joint means 20 and the first end 34 by a minimum distance 80 having a typical value in the range of about one inch to about two inches. Although the minimum distance for spacing may be no less than one inch, the maximum spacing dimension is not so limited and will be described further with reference to FIG. 4.

The intermediate shield 20A has first and second straps 82, 84 having first and second ends with the first end of each of the straps connected to a bracket 86 by fastening means 88. The second end of each of the straps is rotated 900 so that the flat of the strap is connected to the first and second bracket arms 50, 54. As best shown in FIG. 1, the bracket 86 is centrally located on frame rail 30 adjacent to and above the intermediate shield 20A. The bracket 86 is transversely positioned between frame rail 30 and a like rail 30A with its opposite ends connected to frame rails 30, 30A by fastening means 90.

Referring to FIG. 4, the protective cover assembly of the present invention may be further described in connection with the rearward shield 22A. On either side of the shield 22A, at diametrically opposed locations are positioned a plurality of apertures 76, 78 having an elongated axis substantially parallel to the length-wise dimension of the drive train of the vehicle. These elongated apertures 76, 78 correspondingly align with apertures 55 at the distal ends of the bracket arms 50, 54 so that the shield 22A may be adjustably mounted to the bracket arms 50, 54 by use of the nut and bolt systems 52, all as shown in FIG. 4. In this manner, the shield 22A may be mounted to the bracket arms 50, 54 by use of the nut and bolt systems 52, all as shown in FIG. 4. In this manner, the shield 22A may be mounted to the bracket arms 50, 54 after the bracket arms 50, 54 are affixed to the cover of the differential drive means 38. Alternatively, the shield 22A can be adjustably mounted to the bracket arms 50, 54 before the bracket arms 50, 54 are affixed to the cover of the differential drive means 38 and re-positioned inwardly toward the differential drive means 38 by means of the elongated apertures 76, 78 and then tightened in place in the re-positioned location by means of the nut and bolt systems 52. Likewise, each of the other shields, forward and intermediate shields 18A, 20A, respectively, may be re-positioned using the elongated apertures 76, 78 in each of those shields.

Each of the shields, forward, intermediate and rearward shields 18A, 20A and 22A, have substantially similar measurements and dimensions. Each shield is preferred to have a diameter of approximately 12.5 inches, a depth in the range between 6 and 10 inches, and a re-positioning distance in the range between 2 and 4 inches. Further, each shield is preferred to extend beyond the universal joint it substantially overlies by a distance in the range of 1 to 2 inches.

In operation, and with reference to FIG. 1, the shields 18A, 20A and 22A, respectively, shelter the universal joint means 18, 20 and 22 to substantially prevent impingement of any dirt, water or other contaminant created from road grime or water or salt spray on the universal joint means of the drive train carrying the protective cover assembly 10 of the present invention as the vehicle moves along the road or trail. The sheltering provided by shields 18A, 20A, and 22A respectfully preserve the mechanical integrity of universal joint means 18, 20 and 22 each having precision bearings that might otherwise be deleteriously affected by such dirt or grime. In addition, and conversely, the shields 18A, 20A, and 22A, prevent any excessive lubricant, commonly found on non-sealed universal joints 18, 20 and 22 above, especially the universal joint used on an off-road vehicle, from finding its way onto the surface of the vehicle which might otherwise deleteriously affect the physical integrity of that surface, or onto the roadway. Furthermore, for off-road vehicles, the shields 18A, 20A, and 22A, prevent damage to the universal joints 18, 20 or 22 that might otherwise be caused by impediments in the path of the vehicle, e.g. large sticks or stones normally found on off-road tracks traveled by such off-road vehicles.

The arrangement of the placement of the protective cover assembly in the drawings is exemplary only. In the case of a heavy duty truck or bus having dual rear drive axles, additional shields will be needed to be placed between the rear drive axles. The additional shields will have the preferred structural configuration like shield 22A and be attached to the rear cover of the differential of the forward drive axle and the front cover of the differential of the rearward drive axle by a similar means to that described above.

It should now be appreciated that the practice of the present invention provides for a protective cover assembly comprising shields 18A, 20A and 22A, particularly suited for use with motor trucks or buses, or off-road vehicles, some of which may have a drive shaft 12 comprised of first and second sections 14 and 16, as shown in FIG. 1, or have other configurations requiring a greater or lesser number of shields.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A protective cover assembly for a drive train of a vehicle having an underside with at least two frame rails running along the underside of said vehicle, said drive train having at least one section and including at least a forward and a rearward universal joint means each having a known outermost dimension, said at least one section having a first end connected to a drive means of said vehicle by said forward universal joint means and a second end connected to a first end of said rearward universal joint means which has a second end connected to a differential drive means of said vehicle by said rearward universal joint means, said protective cover assembly comprising:

a. a forward shield to catch and retain excess lubricant and particulate matter which escapes from said forward universal joint means dimensioned so as to at least encompass but not touch said forward universal joint means and having attaching means for fixedly mounting to said drive means;

b. a rearward shield to catch and retain excess lubricant and particulate matter which escapes from said rearward universal joint means dimensioned so as to at least encompass but not touch said rearward universal joint means having attaching means for fixedly mounting to said differential drive means; and, c. each of said shield attaching means for adjustable mounting each of said shields for inward and outward positioning relative to each of said drive means and said differential drive means having at least one bracket means for mounting each of said shields respectively to said drive means and said differential drive means, said bracket means extending outward from said drive means and differential drive means to engage each respective one of said shields, the distal end of said at least one bracket means having one or more apertures which correspondingly align with a plurality of diametrically opposed elongated apertures in said shields, said apertures dimensioned to accommodate the insertion and attaching of said fastening means to said shields and said bracket means which means fixedly secure said shields to said drive means and said differential drive means.

2. The protective cover assembly according to claim 1 further comprising an intermediate shield to catch and retain excess lubricant and particulate matter which escapes from a third universal joint means disposed between a first and second segment of said drive train dimensioned so as to at least encompass but not touch said third universal joint means having attaching means for fixedly mounting to at least one of said frame rails, said attaching means for adjustable mounting said intermediate shield for forward and rearward positioning relative to said third universal joint means having first and second bracket means for mounting said shield over said third universal joint means, said bracket means extending downward from said frame rail to engage said intermediate shield, the distal end of said bracket means having one or more apertures which correspondingly align with a plurality of diametrically opposed elongated apertures in said shield, said apertures dimensioned to accommodate the insertion and attaching of said fastening means to said shield and said bracket means which means fixedly secure said shield to said frame rail over said third universal joint means.

3. The protective cover assembly according to claim 2, wherein said forward shield is further dimensioned to encompass but not touch said first end of said first section of said drive train and said intermediate shield is further dimensioned to encompass but not touch said second end of said first section of said drive train.

4. The protective cover assembly according to claim 3, wherein said forward and rearward shields are dimensioned so as to encompass but not touch the respective ends of said at least one section of said drive shaft by an amount in the range from about one inch to about two inches.

5. The protective cover assembly according to claim 2, wherein said intermediate shield is further dimensioned to encompass but not touch a first end of said second section of said drive train and said rearward shield is further dimensioned to encompass but not touch a second end of said second section of said drive train.

6. The protective cover assembly according to claim 5, wherein said intermediate shield is dimensioned so as to encompass but not touch the respective ends of said first and second sections by an amount in the range of about one inch to about two inches.

7. The protective cover assembly according to claim 2, wherein said intermediate shield is dimensioned to extend longitudinally beyond the interconnection of said third universal joint means and said first and second sections and to accommodate a vertical offset of said first and second sections by respective distances in the range of about one inch to about two inches.

8. A protective cover assembly for a drive train of a vehicle having an underside with at least two frame rails running along the underside of said vehicle, said drive train having a first drive shaft and a second drive shaft and a forward, rearward and intermediate universal joint means each having a known outermost dimension, said first drive shaft being attached to a drive means of said vehicle by said forward universal joint means, said second drive shaft being attached to a differential drive means of said vehicle by said rearward universal joint means, and said first drive shaft being connected to said second drive shaft by said intermediate universal joint means, said protective cover assembly comprising:

a. a forward shield to catch and retain excess lubricant and particulate matter which escapes from said forward universal joint means dimensioned so as to at least encompass but not touch said first drive shaft and said forward universal joint means, said forward shield having an attaching means for fixedly mounting to said drive means;

b. an intermediate shield to catch and retain excess lubricant and particulate matter which escapes from said intermediate universal joint means dimensioned so as to at least encompass but not touch said intermediate universal joint means, said intermediate shield having attaching means for fixedly mounting to at least one of said body underside frame rails; and c. a rearward shield to catch and retain excess lubricant and particulate matter which escapes from said rearward universal joint means dimensioned so as to at least encompass but not touch said second drive shaft and said intermediate universal joint means, said rearward shield having an attaching means for fixedly mounting to said differential drive means.

9. The protective cover assembly according to claim 8 wherein said attaching means for adjustable mounting each of said forward and rearward shields for inward and outward positioning relative to each of said drive means and said differential drive means further comprises:

a. at least one bracket means for mounting each of said forward and rearward shields respectively to said drive means and said differential drive means, said bracket means extending outward from said drive means and differential drive means to engage each respective one of said shields; and b. the distal end of said at least one bracket means having one or more apertures which correspondingly align with a plurality of diametrically opposed elongated apertures in said shields, said apertures dimensioned to accommodate the insertion and attaching of fastening means between said shield and said bracket means which means fixedly secure said shields to said drive means and said differential drive means.

10. The protective cover assembly according to claim 8, wherein said attaching means for adjustably mounting said intermediate shield for forward and rearward positioning relative to said intermediate universal joint means further comprises:

a. a first and a second bracket means for mounting said shield over said intermediate universal joint means, said bracket means being oppositely disposed on either side of said intermediate universal joint means, said bracket means extending downward from said frame rail to engage said intermediate shield; and b. the distal end of said bracket means having one or more apertures which correspondingly align with a plurality of diametrically opposed elongated apertures in said shield, said apertures dimensioned to accommodate the insertion and attaching of fastening means between said shield and said bracket means which means fixedly secure said shield to said frame rail over said intermediate universal joint means.

11. The protective cover assembly according to claim 8, wherein said forward, intermediate and rearward shields are dimensioned so as to encompass but not touch the respective ends of said first and second sections of said drive shaft by a distance in the range from about one inch to about two inches and extend along said respective drive shafts a distance in the range from about one inch to about three inches.

12. A protective cover assembly for a drive train of a vehicle having an underside with at least two frame rails running along the underside of said vehicle, said drive train having a first drive shaft and a second drive shaft and a forward, rearward and third universal joint means each having a known outermost dimension, said first drive shaft being attached to a drive means of said vehicle by said forward universal joint, said second drive shaft being attached to a differential drive means of said vehicle by said rearward universal joint, and said first drive shaft being connected to second drive shaft by said third universal joint, said protective cover assembly comprising:

a. a forward shield dimensioned so as to at least encompass but not touch said first drive shaft and said forward universal joint means;

b. an intermediate shield dimensioned so as to at least encompass but not touch said first drive shaft, said third universal joint means and said second drive shaft;

c. a rearward shield dimensioned so as to at least encompass but not touch said second drive shaft and said rearward universal joint means; and d. a means for adjustably mounting said forward, intermediate and rearward shields in their respective juxtaposed positions in relation to said first and second drive shafts and said forward, rearward and third universal joint means.

13. The protective cover assembly according to claim 12, wherein said adjustable mounting means further comprises:

a. first attaching means for mounting each of said forward and rearward shields for inward and outward positioning relative to each of said drive means and said differential drive means having at least one bracket means for mounting each of said forward and rearward shields respectively to said drive means and said differential drive means, said bracket means extending outward from said drive means and differential drive means to engage each respective one of said shields, the distal end of said at least one bracket means having one or more apertures which correspondingly align with a plurality of diametrically opposed elongated apertures in said shields, said apertures dimensioned to accommodate the insertion and attaching of fastening means between said shield and said bracket means which means fixedly secure said shields to said drive means and said differential drive means; and b. second attaching means for adjustably mounting said intermediate shield for forward and rearward positioning relative to said third universal joint means having first and second bracket means for mounting said shield over said third universal joint means, said bracket means being oppositely disposed on either side of said third universal joint means, said bracket means extending downward from said frame rail to engage said intermediate shield, the distal end of said bracket means having one or more apertures which correspondingly align with a plurality of diametrically opposed elongated apertures in said shield, said apertures dimensioned to accommodate the insertion and attaching of fastening means between said shield and said bracket means which means fixedly secure said shield to said frame rail over said third universal joint means.

14. The protective cover assembly according to claim 12, wherein said forward, intermediate and rearward shields are dimensioned so as to encompass but not touch the respective ends of said first and second sections of said drive shaft by a distance in the range from about one inch to about two inches and extend along said respective drive shafts a distance in the range from about one inch to about three inches.

* * * * *